UNITED STATES PATENT OFFICE.

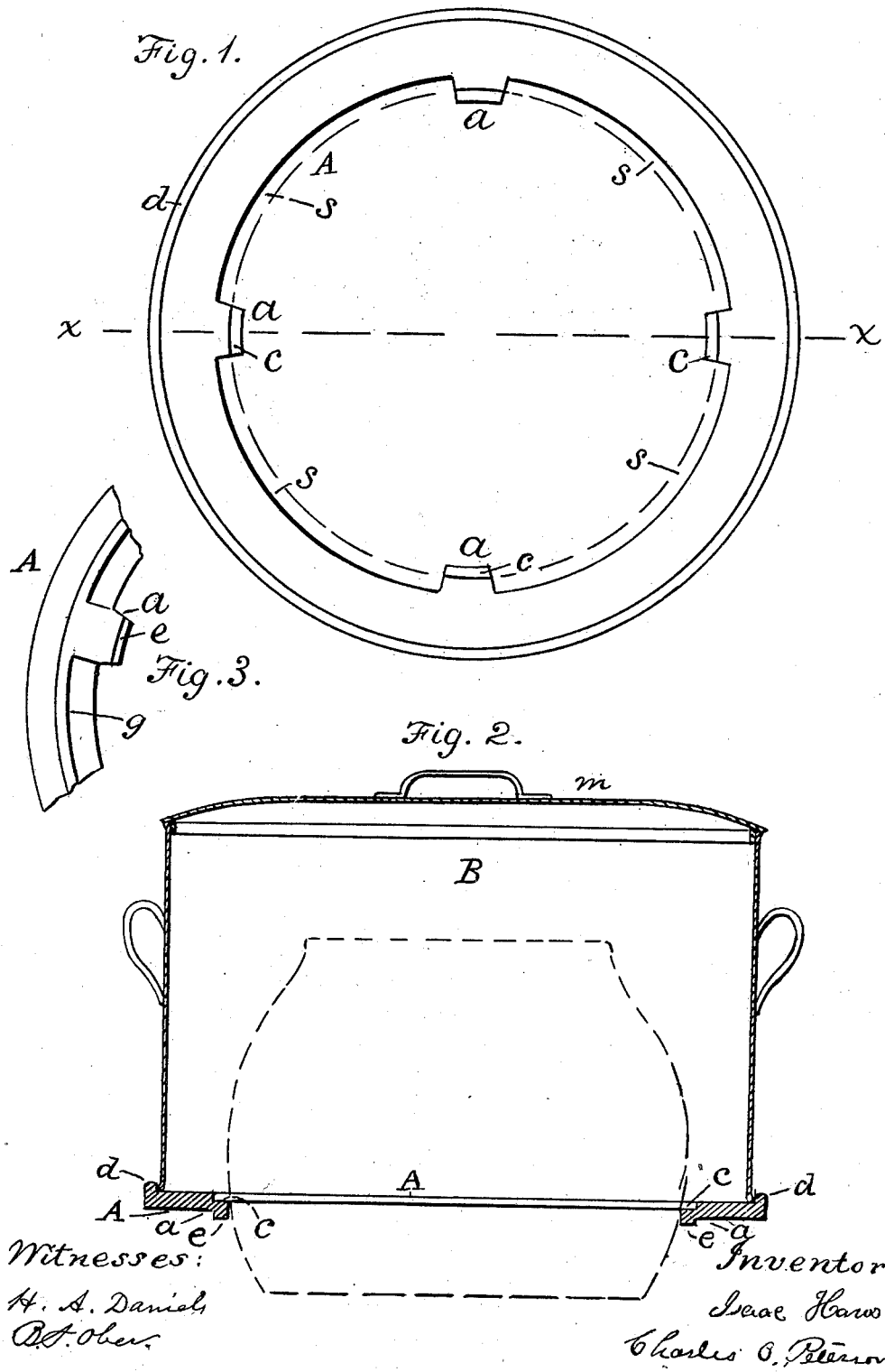

ISAAC HAWS AND CHARLES O. PETERSON, OF REDCREEK, NEW YORK.

COOKING UTENSIL.

SPECIFICATION forming part of Letters Patent No. 670,989, dated April 2, 1901.

Application filed December 29, 1899. Renewed February 28, 1901. Serial No. 49,374. (No model.)

*To all whom it may concern:*

Be it known that we, ISAAC HAWS and CHARLES O. PETERSON, citizens of the United States, residing at Redcreek, in the county of Wayne and State of New York, have invented certain new and useful Improvements in Cooking Utensils; and we do hereby declare the following to be a full, clear, and exact description of the invention, such as will enable others skilled in the art to which it appertains to make and use the same.

This invention relates to cooking utensils; and it consists in certain improvements therein, as hereinafter described and claimed, the object of the invention being to furnish a rim and a hood of improved construction to be employed in connection with a cooking vessel, whereby steam and odors rising from such vessel are prevented from escaping into the room, and water or other fluid, in case it boils over, is prevented from flowing onto the top of the stove.

In the accompannying drawings, Figure 1 represents a plan view of our improved rim. Fig. 2 is a vertical central section of said rim and the hood mounted thereon. Fig. 3 represents a portion of the rim inverted.

A designates a rim constructed to be placed on the stove so as to surround an opening which is usually covered by a lid when the latter is removed.

$a$ indicates inward projections, which are usually made solid with the rim, four of said projections being shown. The said projections are rabbeted at their inward extremities $c$ to form a seat for the stove-lid when the latter is employed in connection with a cooking vessel, the said vessel being placed on said lid. The projections $a$ are provided with downward projections $e$ at their inward extremities to project into the stove-opening when the rim is in place.

The rim A is provided at its outer edge with an annular ridge or bead $d$, which extends entirely around the rim, as shown. An annular projection or rib $g$ is formed on the lower side of the rim, said annular rib, in connection with projections $a$, serving to prevent the passage of air to the cooking vessel and the passage of steam therefrom.

When the rim is placed on the stove in position to surround the opening in the stove from which a lid has been taken, if the cooking vessel is a small one and it is desired to use the lid it may be replaced within the rim, so that the edges of the lid rest on the seat $c$; but when the lid is not used the cooking vessel is placed within the rim and is supported by the inward projections $a$, against which the vessel rests. In either case annular openings $s$ are left surrounding the cooking vessel.

A hood B, which is usually formed of sheet metal, is placed in position over the cooking vessel, as shown in Fig. 2, so that the steam and the odors rising from said vessel are prevented from escaping into the room, but are drawn downward through the annular openings $s$ into the stove, and in case water or fluid in the cooking vessel boils over it is prevented running onto the stove and passes down through the openings $s$. The said hood is made cylindrical, open at the top and at the bottom, and is provided with a cover $m$, adapted to be removed to view the contents of the cooking vessel, as may be desired occasionally.

In Fig. 1 the broken lines indicate the position of the stove-lid when the lid is used, and in Fig. 2 the broken lines indicate the position of a vessel supported by the projections $a$ of the rim, the stove-lid being removed.

We claim—

1. The combination with a stove-rim having a series of inward projections which are rabbeted at their inward extremities, so as to form a seat for a stove-lid or to receive a cooking vessel and to leave annular openings around said vessel or lid, of a hood adapted to entirely cover said cooking vessel and said openings, substantially as and for the purposes described.

2. A stove-rim provided with rabbeted inward projections $a$, said rim being adapted to fit the stove-opening and constructed to receive the stove-lid or a cooking vessel and form annular openings around said vessel or lid, substantially as set forth and described.

In testimony whereof we have affixed our signatures in presence of two witnesses.

ISAAC HAWS.
    CHARLES O. PETERSON.

Witnesses:
  D. G. STUART,
  H. A. DANIELS.